United States Patent [19]

Van Sluys

[11] 3,829,715

[45] Aug. 13, 1974

[54] NOISE REDUCTION SYSTEM

[75] Inventor: Robert Nestor Joseph Van Sluys, Emmasingel, Eindhoven, Netherlands

[73] Assignee: U.S. Philips Corporation, New York, N.Y.

[22] Filed: July 5, 1973

[21] Appl. No.: 376,362

[30] Foreign Application Priority Data

Feb. 8, 1973 Netherlands ....................7301752

[52] U.S. Cl. ................. 307/264, 307/237, 328/162, 328/167, 333/14

[51] Int. Cl. ............................................ H03k 1/14

[58] Field of Search ................ 307/235 R, 237, 264; 328/162, 163, 165, 167; 333/14

[56] References Cited

UNITED STATES PATENTS 3,564,297 2/1971 Elsner ............................ 307/268 X

*Primary Examiner*—John Zazworsky

*Attorney, Agent, or Firm*—Frank R. Trifari; Henry I. Steckler

[57] ABSTRACT

Signal transmission device for use in a noise reduction system. The device includes a circuit which comprises elements which are traversed by the same signal current, inter alia a first impedance, the main current path of a first transistor and a second impedance. The input signal is applied to the base, and the output signal is derived from the collector, of this transistor. The second impedance is frequency-dependent and amplitude-dependent and comprises a transistor the main current path of which is traversed by the signal current and to the base of which a control signal derived from the signal current is applied via a network having a transfer function which is frequency-dependent and amplitude-dependent. A switching element is provided which in a first position enables a control signal derived from the signal current to be directly supplied to the second transistor via the network, whilst in a second position negative feedback of the network is brought about via a negative-feedback element and additional inversion of the control signal. By means of the switching element two complementary transfer functions can be accomplished by this device.

4 Claims, 2 Drawing Figures

NOISE REDUCTION SYSTEM

The invention relates to a signal transmission device having a transfer function which is dependent upon amplitude and frequency for use in a noise reduction system.

The invention relates in particular to signal transmission devices which may be used in noise reduction systems for reducing noise caused by an information channel, especially noise reduction systems which comprise a first signal transmission device which precedes the information channel and a second signal transmission device which succeeds the information channel and has a transfer function which is complementary to the transfer function of the first signal transmission device.

Such noise reduction systems, which of late have drawn much attention, are of particular importance in, for example, magnetic record carriers, for these magnetic record carriers introduce a considerable amount of noise in the signal recorded, and this gives rise to higher annoying effects when the audio- and/or video-information recorded is played back.

The influence of the noise caused by the information channel, in the above example by the magnetic record carrier, on the signal played back can be greatly reduced by means of a noise reduction system of the aforementioned type. For this purpose the signal transmission device which precedes the information channel has a transfer function such that at least signals having a small amplitude and a frequency in the vicinity of the frequency of the noise introduced by the information channel are boosted. As a result, the signal-to-noise ratio of the signal in the information channel, which in the aforementioned example is the magnetic record carrier, will be increased, whilst the signal itself will be distorted owing to this frequency-dependent and amplitude-dependent transfer function. When the signal is played back this distortion must obviously be eliminated again, for which purpose the output of the information channel is applied to a second signal transmission device which has a transfer function which is complementary to that of the first transmission device. Consequently the original signal is obtained in the undistorted condition. However, the noise which is caused by the information channel and the signals which have a corresponding frequency and a small amplitude will be particularly reduced, so that the improved signal-to-noise ratio of the signal in the information channel is retained in playback.

Obviously, to achieve distortion-free playback of the signal it is of particular importance that the transfer functions of the two signal transmission devices, the compressor and the expander, are complementary to one another as exactly as possible. The stringency of this requirement increases with increase in the complexity of the transfer functions of the signal transmission devices in respect of dependence upon amplitude and frequency, but this complexity usually is desirable to obtain effective noise reduction, for in general it will cause the required circuits to be more critical.

Hence, in systems in which both signal transmission devices are used, e.g. tape-recorders suitable both for recording and playback, it will be highly advantageous for the unit which determines the behaviour of these devices with respect to frequency and amplitude to be completely identical for both devices. In this case a single unit may be used which, depending upon the desired function, either compression or expansion, is switched into the first or into the second of the signal transmission devices. This required a switching device the structure and operation of which are determined by the structure of the signal transmission devices and which naturally is to be as simple as possible. Furthermore, signal transmission dêvices in which the likelihood of instabilities due to feedback loops is a minimum will preferably be used. Finally it is desirable that the devices should be capable of being simply manufactured in integrated-circuit form and should occupy a small area.

It is an object of the present invention to provide a signal transmission device which largely complies with the aforementioned requirements. A noise reduction device according to the invention includes a circuit which comprises a first impedance element, the main current path of a first transistor and a second impedance element, which elements of the circuit are traversed in series by the same signal current, an input which is connected to the control electrode of the first transistor, and an output from which the signal voltage across one of the impedance elements may be derived, the impedance realized by the second impedance element having an amplitude-dependent and frequency-dependent, the second impedance element including a second transistor the main current path of which is traversed by the signal current and to the control electrode of which there is applied, via a network having an amplitude-dependent and frequency-dependent transfer function, a first control signal which is derived from the value of the signal current. A switching element being provided which in a first position ensures that a control signal directly derived from the signal current is applied via the network to the base of the second transistor and in a second position brings about negative feed-back of the network via a negative-feedback element and additional inversion of the control signal.

The amplitude-dependent and frequency-dependent behaviour of the network may be obtained by means of a controllable filter or a controllable amplifier, which for this purpose have a control input to which a control signal is applied which is obtained via a control element and which is derived from the value of the signal current. Obviously, as an alternative both the controllable filter and the controllable amplifier may be used. The control element may obviously control the controllable filter or the controllable amplifier according to different criteria. In a preferred embodiment the control element includes a non-linear filter to which a signal is applied which depends upon the amplitude of the first control signal.

Embodiments of the invention will now be described, by way of example, with reference to the accompanying diagrammatic drawings, in which.

In the Figures corresponding elements are designated by like reference symbols.

Figure 1:
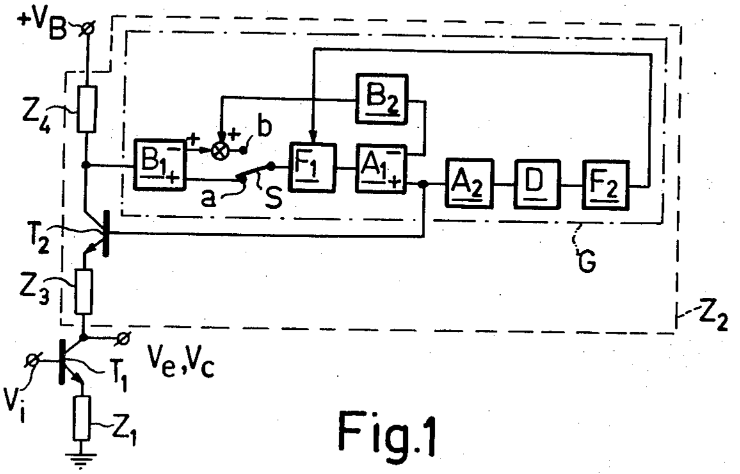
FIG. 1 shows a first embodiment of the transmission device according to the invention.

The signal transmission device shown in FIG. 1 comprises a transistor $T_1$ of the npn-type. The emitter of this transistor $T_1$ is connected to the negative terminal of the supply source, for example to earth, via a first impedance element $Z_1$. The collector of the transistor $T_1$ is connected to the positive terminal $+V_B$ of the supply source via a second impedance element $Z_2$. The input signal $V_i$ is applied to the base of the transistor $T_1$ and the output signal $V_e$, $V_c$ is derived from the collector of the transistor $T_1$. The impedance element $Z_2$ comprises an impedance $Z_4$, the collector emitter path of a transistor $T_2$ of the npn-type and an impedance $Z_3$, which are connected in series between the terminal $+V_B$ and the collector of the transistor $T_1$. The impedance element $Z_2$ further comprises a network G which receives a signal from the impedance $Z_4$ and applies a first control signal derived from this signal to the base of the transistor $T_2$. This network G includes a buffer amplifier $B_1$ having a plus output and a minus output. The plus output of this amplifier is connected to a terminal *a* of a switch S which is connected to a variable filter $F_1$. The filter $F_1$ is connected in series with an amplifier $A_1$ a minus output of which is connected to a buffer amplifier $B_2$ the output signal of which is added to the output signal from the minus output of the amplifier $B_1$, the resulting sum signal being applied to a terminal *b* of the switch S. The signal at a plus output of the amplifier $A_1$ is applied to the base of the transistor $T_2$.

This signal at the plus output of the amplifier $A_1$ is also applied to an amplifier $A_2$, which may have an frequency-dependent amplification-factor. The amplitude of the output signal of said amplifier $A_2$ is measured by means of a detector D and the measured value is applied to a non-linear filter $F_2$ which may have a matrice which is both frequency-dependent and amplitude-dependent. The output signal of this filter is applied to a control input of the filter $F_1$, the cut-off frequency of which is controllable by means of the control signal applied to this control input. Alternatively, the amplifier $A_1$ may be controllable, its amplification factor being controllable by means of a control signal delivered by $F_2$.

Assuming that in the compression mode the switch S is in the position *a*, the base voltage $V'_c$ of the transistor $T_2$ will be equal to:

$$V'_c = -i\, Z_4\, b_z\, f_1\, a_1 \tag{1}$$

where *i* is the current through the series circuit, $b_1$ and $a_1$ are the gain factors of the amplifiers $B_1$ and $A_1$ and $f_1$ is the transfer function of the filter $F_1$. Because $$i = V_i/Z_i$$

the output signal of the compression circuit $V_c$ will be $$V_c = -V_i/Z_1\,(Z_4\, b_1\, f_1\, a_1 + Z_3) \tag{2}$$

In the expansion mode the switch S occupies the position *b*, resulting in a voltage $V'_e$ at the base of the transistor $T_2$:

$$V'_e = i'\, Z_4\, b_1\, f'_1\, a_1/1 + b_2\, f'_1\, a_1 \tag{3}$$

where *i'* is the current flowing through the series circuit, $b_2$ is the gain factor of the amplifier $B_2$ and $f'_1$ is the transfer function of the filter $F_1$. From this there follows for the output voltage during the expansion mode:

$$V_e = i' \left\{ Z_4\, b_1\, f'_1\, a_1/1 + b_2\, f'_1\, a_1 - Z_3 \right\} \tag{4}$$

In the expression (4) and (6) it may be assumed that $f_1 = f'_1$, provided that the absolute value of $V'_c$ is equal to the absolute value of $V'_e$:

$$\left| V'_c \right| = \left| V'_e \right| \tag{5}$$

Assuming $Z_1 = Z_3$, then with $i = V_c/Z_1$ we find from (3), (4), (6) and (7) that the condition for this equality of the absolute values is $$b_2 = Z_4/Z_1\, b_1 \tag{6}$$

If this condition is satisfied, from the equations (2), (4) and (8) it also follows that $$V_e = V_i \tag{7}$$

This means that when the condition (6) is satisfied the two transfer functions are complementary. If $Z_1 = Z_4$, the two amplifiers $B_1$ and $B_2$ may be identical.

Obviously the network G shown in FIG. 1 may be modified in various manners. However, the embodiment shown which includes amplifiers having inverting and non-inverting outputs has the advantage that only a single switch S is required.

Figure 2:
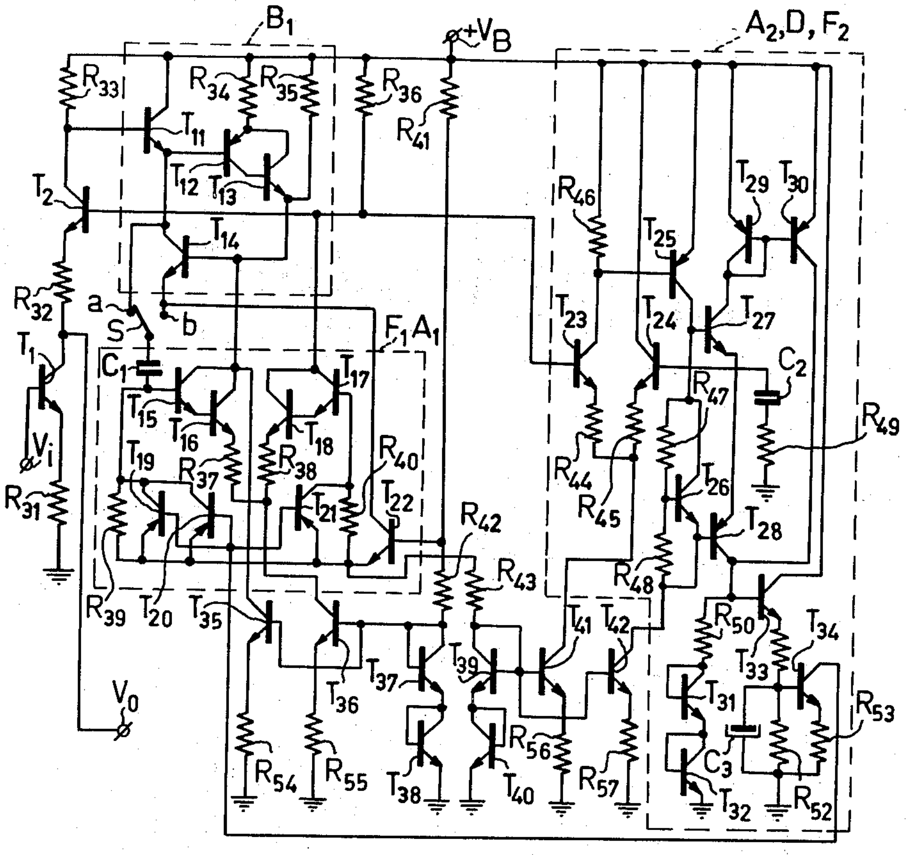
FIG. 2 shows an embodiment conform FIG. 1 to a high degree suitable to be manufactured in integrated circuit form.

FIG. 2 shows an embodiment of an apparatus as shown in FIG. 1 which is suitable for fabrication by integrated circuit techniques, the elements of the network G being enclosed in broken-line boxes. The buffer amplifier $B_1$ comprises transistors $T_{11}$, $T_{12}$, $T_{13}$ and $T_{14}$ and resistors $R_{34}$ and $R_{35}$. The input of this amplifier $B_1$ is the base of the transistor $T_{11}$ which is connected to a resistor $R_{33}$ which corresponds to the impedance $Z_4$ of FIG. 1. The plus output of the amplifier $B_1$ is constituted by the emitter of the transistor $T_{11}$ which is connected to the terminal *a* of the switch S. The signal at this plus output is inverted by means of the transistors $T_{12}$ and $T_{13}$ and the resistors $R_{34}$ and $R_{35}$ and applied via the transistor $T_{14}$ connected as an emitter follower to the terminal *b* of the switch S.

The common terminal of the switch S constitutes the input of the filter $F_1$ combined with the amplifier $A_1$. The amplifier $A_1$ comprises Darlington transistor pairs $T_{15}$, $T_{16}$ and $T_{17}$, $T_{18}$ and emitter resistors $R_{37}$, $R_{38}$. The filter $F_1$ is constituted by the series combination of a capacitor $C_1$ and a resistor $R_{39}$, the junction point of these elements being connected to the base of the transistor $T_{15}$. The transfer characteristic of this high-pass filter can be varied by means of pnp transistors $T_{19}$, $T_{20}$ the emitter collector paths of which shunt the resistor $R_{39}$ and to the base of which a control signal is applied, so that the overall resistance constituted by the parallel combination of the resistor $R_{39}$ and the said transistors can be varied. A third transistor $T_{21}$ identically shunts a resistor $R_{40}$ at the other input of the difference amplifier.

The plus output of the amplifier $A_1$ is constituted by the collector of the transistor $T_{18}$ and is connected to the base of the transistor $T_2$ and, via a collector resistor $R_{36}$, to the positive terminal $+V_B$ of the supply source. The minus output of the amplifier $A_1$ is constituted by the collector of the transistor $T_{16}$ and is connected to the emitter of the transistor $T_{13}$, causing the output voltages from the amplifiers $A_1$ and $B_1$ to be added. The amplifier $B_2$ of FIG. 1 is omitted and hence has the gain factor 1, which is rendered possible by a suitable choice of $Z_1$, $Z_4$, and $b_1$ (see equation (8)).

The control signal for the variable filter $F_1$, which signal is applied to the bases of the transistors $T_{19}$, $T_{20}$ and $T_{21}$, is obtained by means of the combination of the amplifier $A_2$, the detector D and the filter $F_2$. The input signal for this circuit, which is taken from the base of the transistor $T_2$, is first amplified by means of transistors $T_{23}$ and $T_{25}$, after which via $T_{25}$ and $T_{26}$, a class B final stage configuration $T_{27}$ and $T_{28}$ and a current mirror $T_{29}$, $T_{30}$ the signal is rectified, whilst by the inclusion of a capacitor $C_2$ and a resistor $R_{49}$ between the emitters of the transistors $T_{27}$, $T_{28}$ and earth a filter action is also effected. Finally the rectified control voltage undergoes another amplification and filter action by means of transistors $T_{31}$, $T_{32}$, $T_{33}$, $T_{34}$ in conjunction with resistors $R_{50}$, $R_{51}$, $R_{52}$, $R_{53}$ and a capacitor $C_3$. The collector current of the transistor $T_{34}$ is used as a control signal for the variable filter $F_1$, for which purpose this collector is connected to the bases of the transistors $T_{19}$, $T_{20}$ and $T_{21}$. The quiescent currents for the various transistors of the amplifiers $A_1$ and $B_1$ are supplied by a multiple current source comprising transistors $T_{35}$ and $T_{36}$ which receive their bias via the series connection of resistors $R_{41}$, $R_{42}$ and diodes $T_{37}$, $T_{38}$. The amplifier $A_2$ and the detector D receive quiescent currents for their transistors via a multiple current source comprising transistors $T_{41}$ and $T_{42}$ the bias for which is derived from the said series combination $R_{41}$, $R_{42}$, $T_{37}$, $T_{38}$ via an emitter follower $T_{22}$, a resistor $R_{43}$ and diodes $T_{39}$, $T_{40}$.

Although in the embodiments shown by way of example only bipolar transistors are used, unipolar transistors may obviously be used also.

What is claimed is:

1. Signal transmission device having a transfer function which is amplitude-dependent and frequency-dependent for use in a noise reduction system including a circuit which comprises a first impedance element, the main current path of a first transistor and a second impedance element, which elements of the circuit are traversed in series by the same signal current, an input which is connected to the control electrode of the first transistor, and an output from which the signal voltage across one of the impedance elements may be derived, the impedance realized by the second impedance element having a nature which is amplitude-dependent and frequency-dependent, the second impedance element including a second transistor the main current path of which is traversed by the signal current and to the control electrode of which a first control signal derived from the value of the signal current is applied via a network, whereas a switching element is provided which in a first position enables a control signal derived from the signal current to be directly supplied to the second transistor via the network, whilst in a second position negative feed-back of the network is brought about via a negative-feed-back element and additional inversion of the control signal.

2. Signal transmission device as claimed in claim 1, characterized in that the network is preceded by a first amplifier which has a first input and a second input capable of delivering output signals in mutual phase opposition, and in that the switching element in its first position establishes a connection between the first output of the said first amplifier and the input of the network and in its second position establishes a connection between the input of the network and a summation circuit to which are applied the signal from the first output of the first amplifier and the negative-feedback signal obtained via the negative-feedback element.

3. Signal transmission device as claimed in claim 2, characterized in that the network includes a second amplifier having a first output and a second output capable of delivering two output signals in mutual phase opposition, the control signal for the second transistor being taken from the first output of this second amplifier, whilst the signal for the negative-feedback element is taken from the second output of this second amplifier.

4. Signal transmission device as claimed in claim 3, characterized in that the negative-feedback element has a gain factor which is equal to the quotient of the gain factor of the first amplifier and the value of the amplitude-independent impedance multiplied by the transfer function of the signal current to the input signal for the first amplifier.

* * * * *